(12) United States Patent
Kamimura et al.

(10) Patent No.: US 7,891,266 B2
(45) Date of Patent: Feb. 22, 2011

(54) GEAR POSITION DISPLAY DEVICE OF TRANSMISSION

(75) Inventors: Motoaki Kamimura, Toyota (JP); Yasushi Kobiki, Toyota (JP); Yoshiharu Harada, Toyota (JP); Akio Murasugi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 590 days.

(21) Appl. No.: 11/375,006

(22) Filed: Mar. 15, 2006

(65) Prior Publication Data

US 2006/0231011 A1 Oct. 19, 2006

(30) Foreign Application Priority Data

Apr. 1, 2005 (JP) ............................. 2005-106953

(51) Int. Cl.
*B60K 17/04* (2006.01)
(52) U.S. Cl. .................... 74/473.12; 116/28.1
(58) Field of Classification Search ............... 74/473.1, 74/473.22, 335, 473.18, 473.12; 116/28.1
See application file for complete search history.

(56) References Cited

U.S. PATENT DOCUMENTS 6,090,009 A 7/2000 Kosik et al.
6,164,149 A * 12/2000 Ohmori et al. ............ 74/336 R
6,462,651 B1 10/2002 Consiglio et al.
6,470,771 B2 * 10/2002 Nanri et al. ................ 74/733.1

FOREIGN PATENT DOCUMENTS

| | | |
|---|---|---|
| DE | 196 39 200 C1 | 12/1997 |
| DE | 199 46 904 A1 | 2/2001 |
| JP | 61-81044 | 5/1986 |
| JP | 3-118354 | 12/1991 |
| JP | 6-94111 | 4/1994 |
| JP | 8-270786 | 10/1996 |

\* cited by examiner

*Primary Examiner*—Richard W Ridley
*Assistant Examiner*—Matthew A Johnson
(74) *Attorney, Agent, or Firm*—Oblon, Spivak, McClelland, Maier & Neustadt, L.L.P.

(57) ABSTRACT

A gear position display device includes a transmission having a plurality of gear positions, a speed-changing control portion outputting a speed-changing instruction, a display portion displaying a gear position of the transmission, and a detection portion detecting a speed-changing state of a gear position based on the speed-changing instruction, wherein a gear position based on the speed-changing instruction from the speed-changing control portion is displayed after the detection portion confirms actual starting of speed-changing.

19 Claims, 6 Drawing Sheets

FIG. 3

| | C1 | C2 | C3 | C4 | B1 | B2 | B3 | B4 | F0 | F1 | F2 | F3 |
|---|---|---|---|---|---|---|---|---|---|---|---|---|
| P | | | | | | | | | | | | |
| R | E | | E | | E(E/B) | | | E | | E | | |
| N | | | | | | | | | | | | |
| 1st | E | | | E(E/B) | | | E | | E | | | E |
| 2nd | E | | E | E(E/B) | | E(E/B) | E(D) | | E | | E | |
| 3rd | E | E | | E(E/B) | E(E/B) | | E(D) | | E | E | | |
| 4th | E(D) | E | E(D) | | | | E(D) | | | E | | |
| 5th | E(D) | E | E | | E(D) | E | E(D) | | | | | |
| 6th | | | | | | | | | | | | |

E : ENGAGEMENT
E(E/B) : ENGAGEMENT FOR ENGINE BRAKE
E(D) : ENGAGEMENT NOT ASSOCIATED WITH POWER TRANSFER

GEAR POSITION DISPLAY DEVICE OF TRANSMISSION

This nonprovisional application is based on Japanese Patent Application No. 2005-106953 filed with the Japan Patent Office on Apr. 1, 2005, the entire contents of which are hereby incorporated by reference.

BACKGROUND OF THE INVENTION

1. Field of the Invention

The present invention relates to a gear position display device for displaying a gear position of a transmission.

2. Description of the Background Art

A display device of an automatic transmission is known, which displays a gear position of a transmission during a run. (For example, Japanese Patent Laying-Open No. 06-094111.)

In a gear position display device of an automatic transmission as that described in the aforementioned document, a target gear position is displayed concurrently with an output of a speed-changing instruction.

When the transmission automatically switches gear positions based on an operation state of a vehicle, however, a driver does not feel a speed being changed until behavior of the vehicle changes in association with speed-changing.

Therefore, changing of display of the gear position concurrently with an output of the speed-changing instruction may cause an uneasy feeling of the driver because the display is changed from a current gear position to a target gear position before the driver recognizes the speed-changing.

SUMMARY OF THE INVENTION

An object of the present invention is to display a gear position of a transmission corresponding to an actual state of speed-changing.

A gear position display device of a transmission according to the present invention includes a transmission having a plurality of gear positions, a speed-changing control portion outputting a speed-changing instruction, a display portion displaying a gear position of the transmission, and a detection portion detecting a speed-changing state of a gear position based on the speed-changing instruction, wherein the display portion displays a gear position based on the speed-changing instruction from the speed-changing control portion after the detection portion confirms actual starting of speed-changing.

According to the present invention, since a target gear position specified by the speed-changing instruction is displayed when speed-changing is actually started, display of a gear position is enabled which causes less uneasy feeling of a driver.

Preferably, the detection portion includes a change rate detection portion detecting a rate of change in a rotation number of the transmission, and the display portion confirms starting of speed-changing based on the speed-changing instruction when the rate of change in a rotation number detected with the change rate detection portion becomes at least a predetermined value and displays a gear position based on the speed-changing instruction from the speed-changing control portion.

According to the present invention, since the gear position based on the speed-changing instruction is displayed based on the rate of change in a rotation number of the transmission, starting of speed-changing with the speed-changing instruction can be accurately detected and an uneasy feeling of the driver can further be decreased.

Further preferably, the transmission can be selected to operate in one of an automatic speed-changing mode wherein a change of a gear position is automatically controlled corresponding to an operation state and a manual speed-changing mode wherein a manual manipulation to an arbitrary gear position or a shift range is possible and, only in the automatic speed-changing mode, the display portion confirms starting of speed-changing when the rate of change in a rotation number detected with the change rate detection portion becomes at least a predetermined value and displays a gear position based on the speed-changing instruction.

According to the present invention, since the gear position based on the speed-changing instruction is displayed based on the rate of change in a rotation number of the transmission only in the automatic speed-changing mode, starting of speed-changing with the speed-changing instruction can be accurately detected and an uneasy feeling of the driver can further be decreased.

Further preferably, the transmission can be selected to operate in one of an automatic speed-changing mode wherein a change of a gear position is automatically controlled corresponding to an operation state and a manual speed-changing mode wherein a manual manipulation to an arbitrary gear position or a shift range is possible and, only in the automatic speed-changing mode, the display portion displays a gear position based on the speed-changing instruction after the detection portion confirms actual starting of speed-changing.

According to the present invention, since a target gear position specified by the speed-changing instruction is displayed when speed-changing is actually started only in the automatic speed-changing mode, display of a gear position is enabled which causes less uneasy feeling of the driver.

According to the present invention, when a speed is changed with downshifting from a fifth gear to a third gear via a fourth gear, for example, a gear position (the fourth gear) which is maintained only for an extremely short time is not displayed on the gear position display device. Therefore, display of the gear position matches a feeling of the driver, which can decrease the uneasy feeling of the driver.

During operation in the manual speed-changing mode, an intention of the driver is largely reflected in speed-changing control. When a speed is to be changed with shifting from the fifth gear to the third gear, for example, the driver often intends to shift to the third gear via the fourth gear which is an intermediate gear position. If display of the intermediate gear position is prohibited in the manual speed-changing mode as such, it may undesirably cause an uneasy feeling of the driver. Therefore, prohibition of the display of the intermediate gear position is invalidated during operation in the manual speed-changing mode to enable display of the gear position which causes less uneasy feeling of the driver.

Furthermore, a shift to a higher gear is generally performed relatively slowly and the intermediate gear position is maintained for a relatively long time. If display of the intermediate gear position is prohibited in such situation, it may undesirably cause an uneasy feeling of the driver. Therefore, prohibition of the display of the intermediate gear position is invalidated during the shift to a higher gear to enable display of the gear position which causes less uneasy feeling of the driver.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a table indicating engagement of the automatic transmission according to the embodiment of the present invention.

DESCRIPTION OF THE PREFERRED EMBODIMENT

Figure 1:
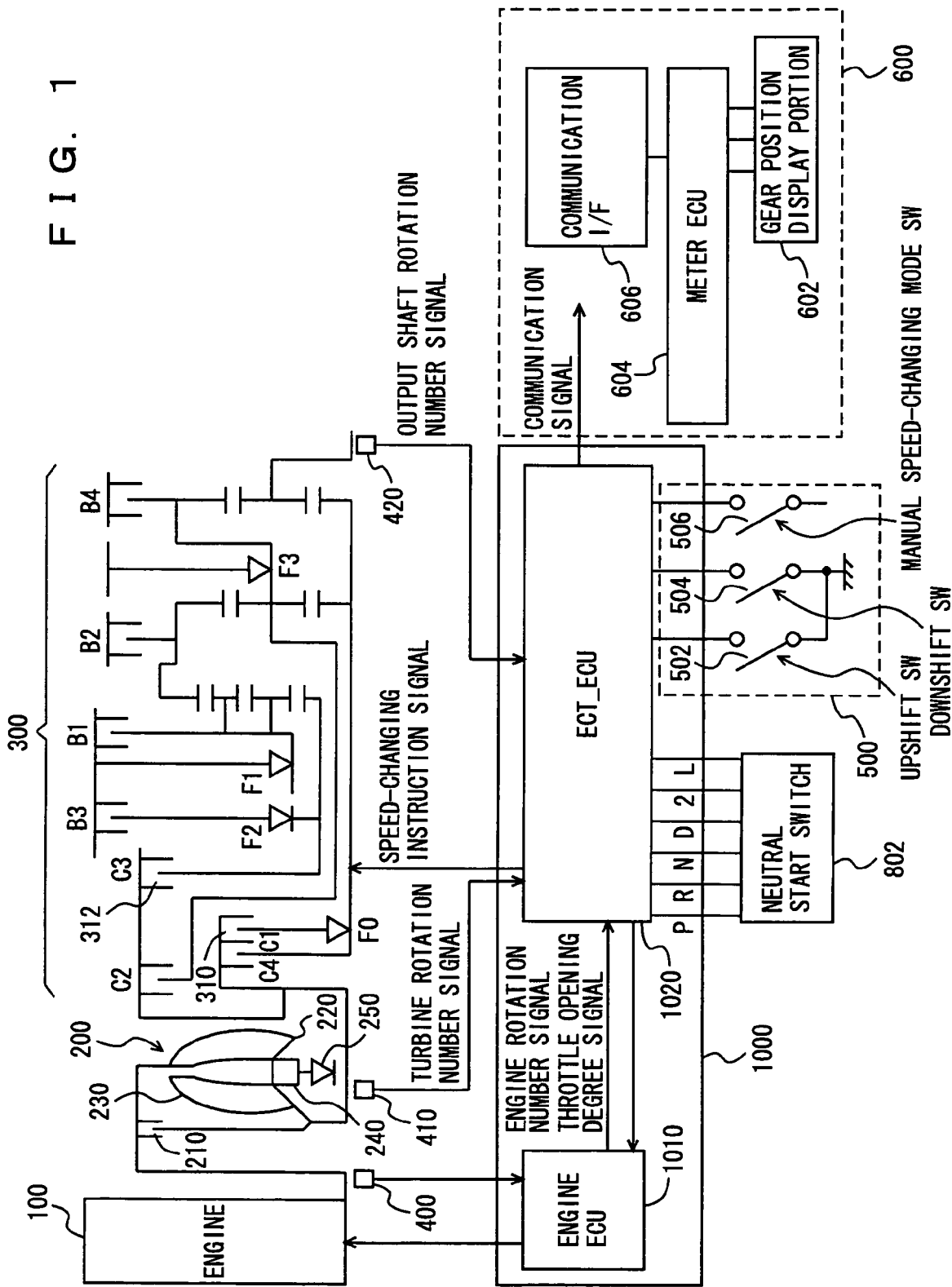
FIG. 1 shows a construction of a vehicle including an automatic transmission according to an embodiment of the present invention.

A display device of a transmission according to an embodiment of the present invention will now be described referring to the drawings. In a description below, the same parts are indicated with the same characters. Since the parts have the same names and functions, detailed descriptions thereof will not be repeated.

As shown in FIG. 1, the device according to this embodiment is constructed with an engine 100, a torque converter 200, an automatic transmission 300, a shift lever assembly 500, a combination meter 600, and a control device (ECU) 1000.

Engine 100 and automatic transmission 300 are connected to each other via torque converter 200, and an output shaft of engine 100 is connected to an input shaft of torque converter 200. That is, engine 100 and torque converter 200 are coupled to each other with a rotation shaft.

Torque converter 200 is constructed with a lockup clutch 210 directly coupling the input shaft with the output shaft, and a stator 240 having a pump 220 on a side of the input shaft, a turbine 230 on a side of the output shaft and a one-way clutch 250 for implementing a torque amplification function.

Turbine 230 of torque converter 200 and automatic transmission 300 are connected to each other with a rotation shaft. A rotation number of turbine 230 is detected with a turbine rotation number sensor 410. A rotation number of an output shaft of automatic transmission 300 is detected with an output shaft rotation number sensor 420.

Shift lever assembly 500 is constructed with an upshift switch 502, a downshift switch 504 and a manual speed-changing mode switch 506, and outputs a signal from upshift switch 502, a signal from downshift switch 504 and a signal from manual speed-changing mode switch 506 to a control device (hereafter referred to as an "ECT_ECU") 1020 included in ECU 1000 to control automatic transmission 300, which is described below.

Figure 2:
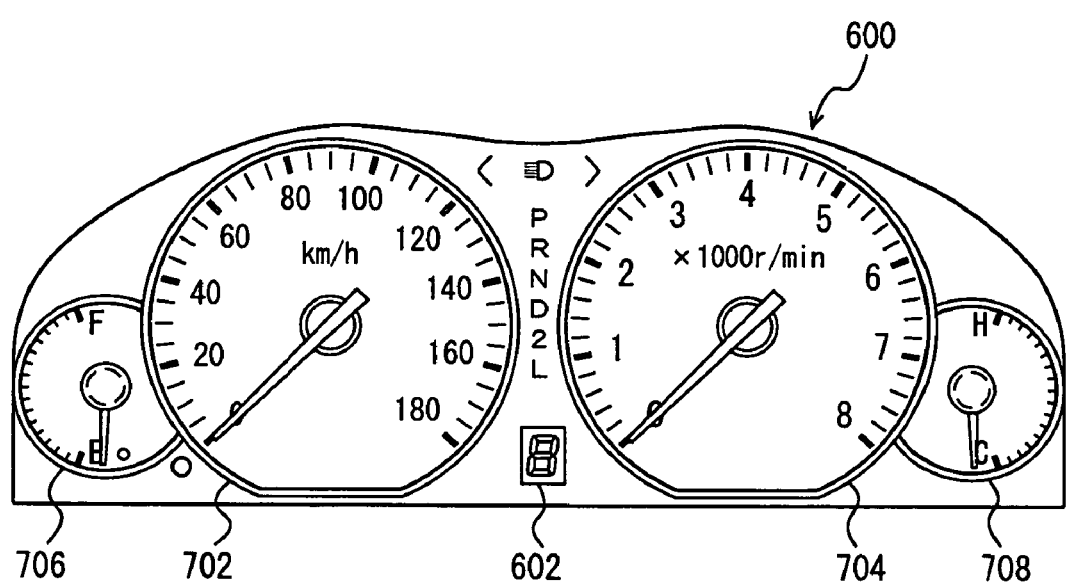
FIG. 2 shows an appearance of a combination meter of the automatic transmission according to the embodiment of the present invention.

Combination meter 600 is constructed with a gear position display portion 602, a meter ECU 604 connected to gear position display portion 602 and a communication interface 606, as shown in FIG. 1, and includes a speed meter 702, a tachometer 704, a fuel meter 706, and a water temperature meter 708, as shown in FIG. 2.

In a situation of a forward 6-speed transmission, for example, gear position display portion 602 lights up a character indicating "6" in a forward running state with a gear position of the lowest speed change ratio, a character indicating "2" in a forward running state with a gear position of the second highest speed change ratio, and a character indicating "1" in a forward running state with a gear position of the highest speed change ratio.

Gear position display portion 602 performs light-up display of the gear position based on a speed-changing signal from ECT_ECU 1020 including speed-changing control means of the present invention, as described below.

FIG. 3 is a table indicating operations of automatic transmission 300. The table of FIG. 3 indicates engagement and disengagement of friction elements, that is, a clutch (C1-C4 in the drawing), a brake (B1-B4) and a one-way clutch (F0-F3) when the elements form each gear position. Engagement and disengagement of each of the clutch, brake and one-way clutch are controlled by ECT_ECU 1020 so as to form a gear position corresponding to an operation state of a vehicle. In FIG. 3, a character "E" indicates an engagement state, a character "E(E/B)" indicates engagement for making an engine brake effective, a character "E(D)" indicates engagement not associated with torque transfer, and a blank indicates a disengagement state.

Figure 4:
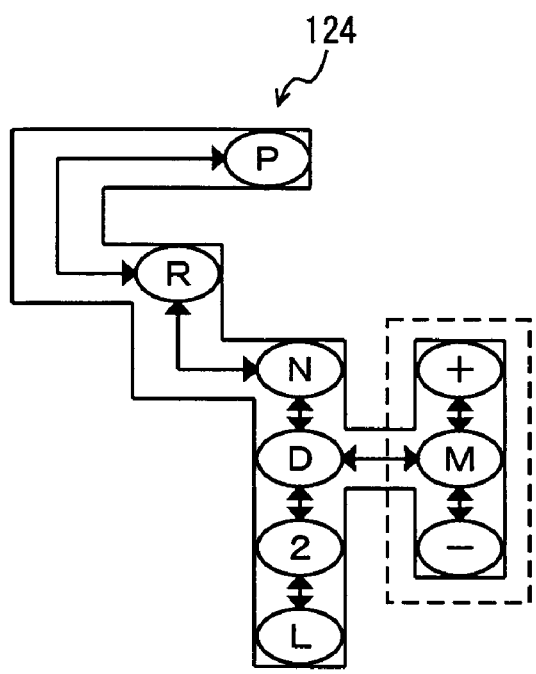
FIG. 4 shows an appearance of a shift gate of the automatic transmission according to the embodiment of the present invention.

In addition, automatic transmission 300 can be selected to operate in one of an automatic speed-changing mode wherein a change of a gear position is automatically controlled and a manual speed-changing mode wherein a change to an arbitrary gear position is controlled based on a manual manipulation of a driver. The driver can select one of the automatic speed-changing mode and the manual speed-changing mode by, for example, turning on or off manual speed-changing mode switch 506 with a manipulation of a shift lever, which is not shown. As shown in FIG. 4, the driver manipulates the shift lever along a shift passage formed in a shift gate 124, and when the shift lever is moved to a position "M" indicating the manual speed-changing mode, manual speed-changing mode switch 506 is turned on. ECT_ECU 1020 determines that the manual speed-changing mode is selected when an ON signal of manual speed-changing mode switch 506 is received. When the driver moves the shift lever from the position "M" to a position "+" (upward in FIG. 4) in this situation, upshift switch 502 is turned on. When upshift switch 502 is turned on, ECT_ECU 1020 instructs each friction element to be engaged or disengaged so as to increase a speed change ratio. In addition, when the driver moves the shift lever from the position "M" to a position "−" (downward in FIG. 4), downshift switch 504 is turned on and ECT_ECU 1020 instructs each friction element to be engaged or disengaged so as to decrease the speed change ratio. In this situation, lighting of gear position display portion 602 is controlled based on a signal from ECT_ECU 1020.

On the other hand, the driver manipulates the shift lever along the shift passage formed in shift gate 124 to move to one of positions "D", "2" and "L", and thereby the automatic speed-changing mode is selected. The driver can select a power transfer state of automatic transmission 300 by changing a position of the shift lever. When the driver moves the shift lever to the position "D", for example, the vehicle is set to a forward running state in the automatic speed-changing mode. More specifically, ECT_ECU 1020 controls the automatic transmission to set to the forward running state based on a speed-changing instruction signal corresponding to the forward running state which is sent from a neutral start switch 802. Gear position display portion 602 is controlled based on a signal from ECT_ECU 1020.

ECU 1000 controlling a power train of the vehicle in this embodiment includes an engine ECU 1010 controlling engine 100 and ECT_ECU 1020 controlling automatic transmission 300.

ECT_ECU 1020 includes speed-changing control means and detection means of the present invention and performs light-up display of the gear position according to the present invention according to a prescribed program stored in an ROM.

ECT_ECU 1020 includes the speed-changing control means of the present invention, and receives inputs of a signal indicating a turbine rotation number from turbine rotation number sensor 410, a signal indicating an output shaft rotation number from output shaft rotation number sensor 420, a signal from neutral start switch 802, and a signal indicating a throttle opening degree detected in a throttle position sensor from engine ECU 1010. In addition, the speed-changing control means is made to determine as to selection of a proper gear position and execution of speed-changing from the signal indicating an output shaft rotation number which is input from output shaft rotation number sensor 420 and a signal indicating an engine rotation number which is input from engine ECU 1010 based on a prescribed speed-changing diagram.

Furthermore, ECT_ECU 1020 is made to calculate a variation in a turbine rotation number based on an input signal indicating the turbine rotation number to detect progress of speed-changing.

Figure 7:
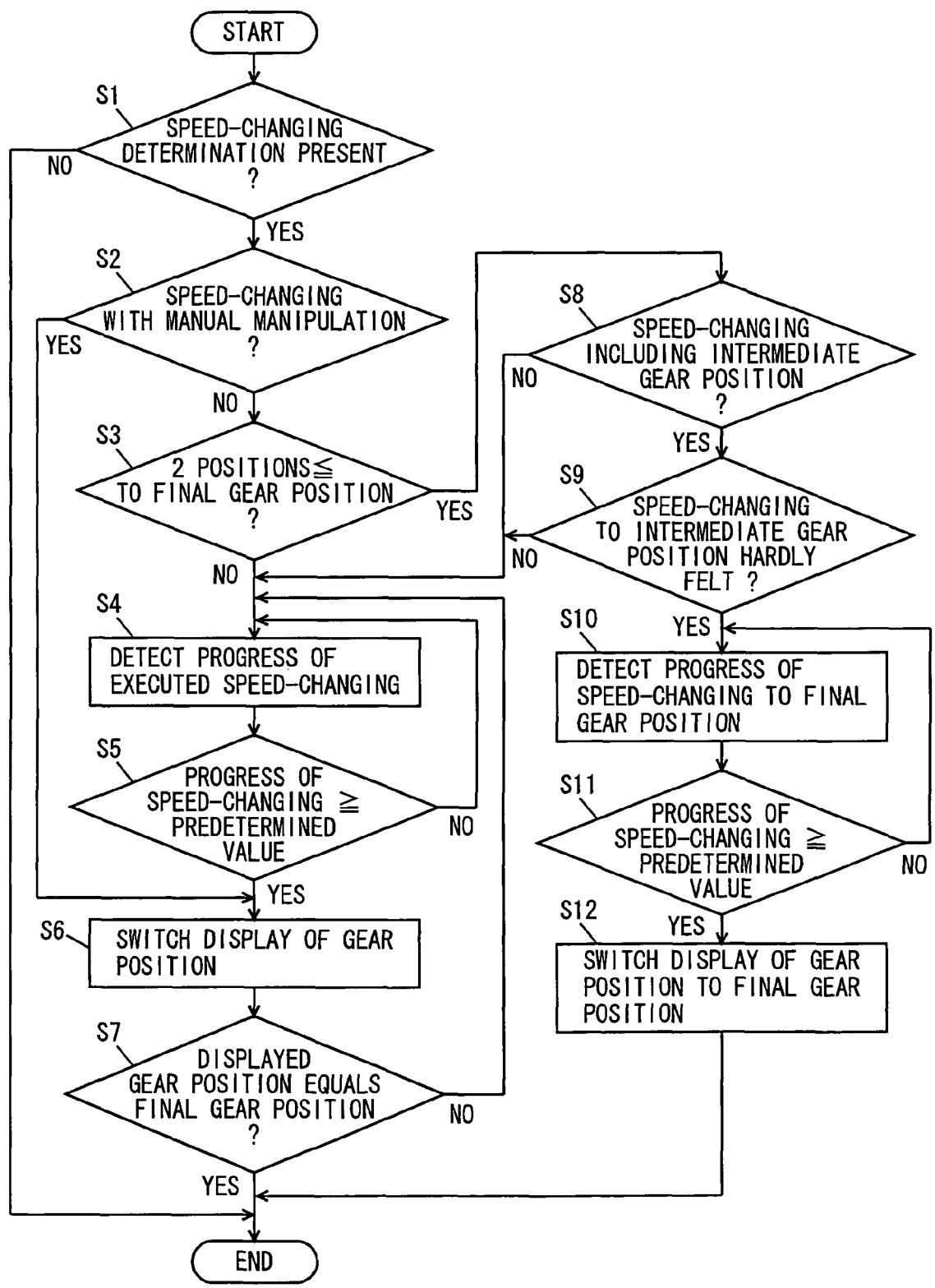
FIG. 7 is a flow chart of a control structure of a program executed in a meter ECU included in a display device of the automatic transmission according to the embodiment of the present invention.

An example of control with the control device of the above-described automatic transmission is described based on FIGS. 3 and 7. FIG. 7 is a flow chart of a program according to this embodiment.

First, in step 1, presence or absence of a speed-changing determination is determined. More specifically, presence or absence of a speed-changing determination is determined with the detection means in ECT_ECU 1020 by determining a change to a target gear position different from a current gear position based on the signal from neutral start switch 802, an input signal indicating a throttle opening degree from engine ECU 1010 and an input signal from output shaft rotation number sensor 420 and based on the prescribed speed-changing diagram, or by determining as to whether signals from the manual speed-changing mode switch and upshift switch 502 or downshift switch 504 have been input to ECT_ECU 1020 or not.

When absence of the speed-changing determination is determined in step 1, this control is ended and returned. On the other hand, when presence of the speed-changing determination is determined in step 1, this control goes to step 2 and a determination is made as to whether speed-changing with a manual manipulation is performed or not. More specifically, a determination is made as to whether a signal from upshift switch 502 or downshift switch 504 has been input to ECT_ECU 1020 or not.

When a positive determination is made in step 2, the control goes to step 6 described below. When a negative determination is made in step 2, the control goes to step 3 and ECT_ECU 1020 determines as to whether the target gear position is at least two positions away from the current gear position or not.

When a negative determination is made in step 3, the control goes to step 4 and detects progress of speed-changing which is executed based on the speed-changing determination in step 1. The progress of speed-changing is determined based on a variation in a turbine rotation number input from turbine rotation number sensor 410 to ECT_ECU 1020.

In a subsequent step 5, a determination is made as to whether the progress of speed-changing detected in step 4 is at least a predetermined value or not. In this embodiment, the predetermined value is set to, for example, about 10% of a difference between a turbine rotation number at the current gear position and a turbine rotation number at the target gear position, each of which is obtained from a speed of a car and a speed change ratio of each gear position. The predetermined value can be set as appropriate to correspond to a timing of generation of a shock due to speed-changing during execution of the speed-changing. More desirably, the predetermined value is set to correspond to a timing of initial generation of a shock which is large enough to be felt by the driver after starting of a speed-changing operation.

When a negative determination is made in step 5, the control returns to step 4 to wait until the progress of speed-changing attains at least the predetermined value. On the other hand, when a positive determination is made in step 5, ECT_ECU 1020 instructs gear position display portion 602 to display a gear position after the speed-changing in step 6, and the control goes to step 7.

In step 7, a determination is made as to whether the gear position after the speed-changing instructed to gear position display portion 602 is equal to the target gear position or not. When the gear positions are equal, the control is ended and returned. When the gear positions are not equal, the control returns to step 4.

Returning to step 3, when it is determined that the gear position is at least two positions away in step 3, the control goes to step 8 and a determination is made as to whether or not the speed-changing is performed via an intermediate gear position between the current gear position and the target gear position.

When it is determined that the speed-changing is not performed via the intermediate gear position, the control goes to step 4. On the other hand, when it is determined that the speed-changing is performed via the intermediate gear position, the control goes to step 9 and a determination is made as to whether speed-changing to the intermediate gear position is hardly felt or not. The determination as to whether the speed-changing to the intermediate gear position is hardly felt or not is made based on a time required to attain the target gear position from the current gear position. In this embodiment, the time required for speed-changing is considered to be a long time in a situation of an upshift, and is considered to be a short time in a situation of a downshift. This is because, in most of situations of a downshift to the gear position of at least two positions away, the driver may press down an accelerator pedal and thus rotational synchronization with the target gear position is completed relatively early, while in a situation of an upshift to the gear position of at least two positions away, rotational synchronization with the target gear position is performed mainly by engagement operations of friction elements.

When a negative determination is made in step 9, the control goes to step 4. When a positive determination is made, on the other hand, the control goes to step 10 and apparent progress of speed-changing from the current gear position to the target gear position is detected. Though the progress of speed-changing is determined as in step 5 based on a variation in a turbine rotation number input from turbine rotation number sensor 410 to ECT_ECU 1020, the apparent progress of speed-changing in this step is detected from a difference between a turbine rotation number at the current gear position and a turbine rotation number at the target gear position, each of which is obtained from a speed of a car and a speed change ratio of each gear position, and a turbine rotation number at the intermediate gear position is not considered.

In a subsequent step 11, a determination is made as to whether the progress of speed-changing detected in step 10 is at least a predetermined value or not. In this embodiment, the predetermined value is set to, for example, about 10% of a difference between a turbine rotation number at the current gear position and a turbine rotation number at the target gear position, each of which is obtained from a speed of a car and a speed change ratio of each gear position. The predetermined value can be set as appropriate to correspond to a timing of generation of a shock due to speed-changing during execution of the speed-changing.

When a negative determination is made in step 11, the control returns to step 10 to wait until the progress of speed-changing attains at least the predetermined value. On the other hand, when a positive determination is made in step 11, meter ECU 604 instructs gear position display portion 602 to display the target gear position, and the control is ended and returned.

Actual operations of this embodiment will now be described based on FIGS. 5 and 6.

Figure 5:
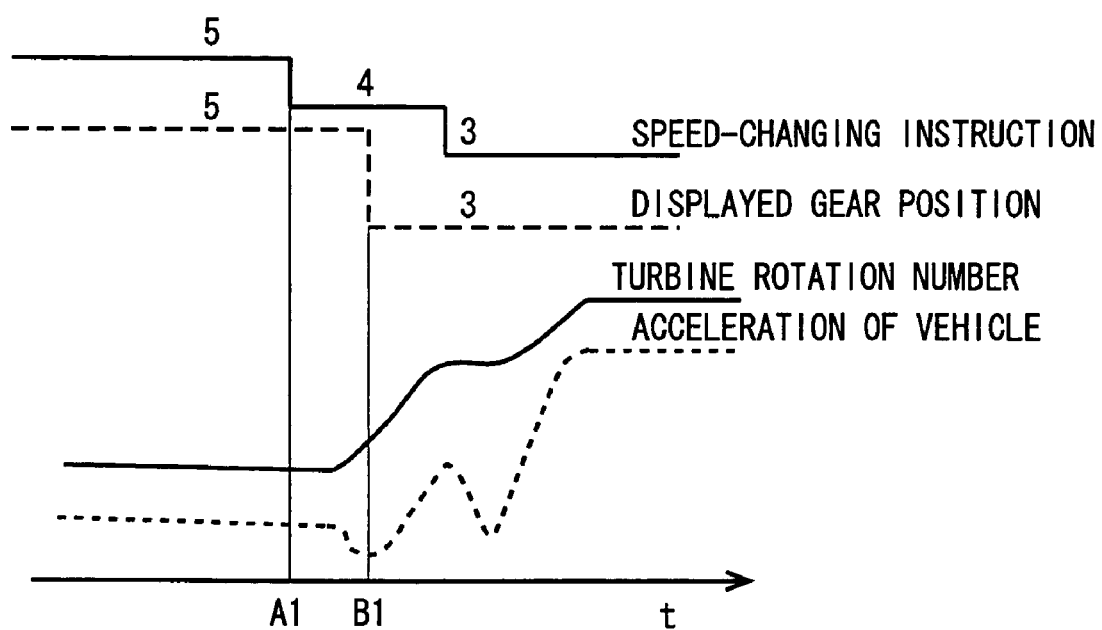
FIG. 5 indicates a relationship between a rotation number of a turbine and an acceleration of a vehicle with an elapsed time from a speed-changing instruction in an automatic speed-changing mode of a vehicle including the automatic transmission according to the embodiment of the present invention.

FIG. 5 is a time chart indicating a downshift in this control, which indicates a switching timing of display of a gear position when a current gear position is a fifth gear and a target gear position is set to a third gear at a time point A1. In this situation, since speed-changing to a gear position which is at least two positions away is determined in step 3, the control goes to step 8 and, with a determination that the speed-changing is performed via a fourth gear as an intermediate gear position, the control then goes to step 9. Since the speed-changing is a downshift, it is determined in step 9 that the speed-changing to the intermediate gear position is hardly felt. Therefore, switching of meter display from "5" to "3" is performed at a time point B1 which corresponds to about 10% of a difference between a turbine rotation number at the fifth gear as the current gear position and a turbine rotation number at the third gear as the target gear position. In this situation, "4" is not displayed since it is determined in step 9 that the speed-changing to the fourth gear as the intermediate gear position is hardly felt.

Figure 6:
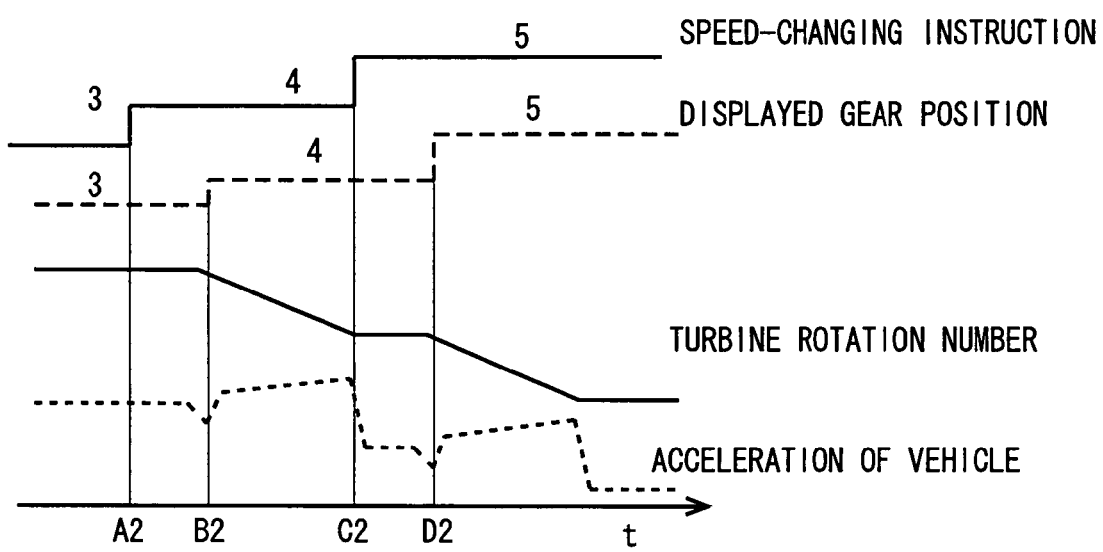
FIG. 6 indicates a relationship between a rotation number of a turbine and an acceleration of a vehicle with an elapsed time from a speed-changing instruction in a manual speed-changing mode of a vehicle including the automatic transmission according to the embodiment of the present invention.

FIG. 6 is a time chart indicating an upshift in this control, which indicates a switching timing of display of a gear position when a current gear position is the third gear and a target gear position is set to the fifth gear at a time point A2. In this situation, since speed-changing to a gear position which is at least two positions away is determined in step 3, the control goes to step 8 and, with a determination that the speed-changing is performed via the fourth gear as an intermediate gear position, the control then goes to step 9. Since the speed-changing is an upshift, a negative determination is made in step 9. Switching of meter display from "3" to "4" is performed at a time point B2 which corresponds to about 10% of a difference between a turbine rotation number at the third gear as the current gear position and a turbine rotation number at the fourth gear as the intermediate gear position. Then, after an instruction is given to change from the fourth gear to the fifth gear at a time point C2, switching of meter display from "4" to "5" is performed at a time point D2 which corresponds to about 10% of a difference between a turbine rotation number at the fourth gear as the current gear position and a turbine rotation number at the fifth gear as the target gear position.

Though the determination as to whether the intermediate gear position is hardly felt or not is made based on a situation of an upshift or a downshift in step 9 in this embodiment, the determination that the intermediate gear position is hardly felt can be made when speed-changing is performed in a region of at least a prescribed speed change ratio which involves a relatively small variation in the speed change ratio, and a negative determination can be made when the speed-changing is performed over the prescribed speed change ratio or in a region of at most the prescribed speed change ratio.

In addition, though the automatic transmission including the manual speed-changing mode is illustrated in this embodiment, the manual speed-changing mode may not be included. The present invention can also be applied to an automatic transmission in which a shift range is switched with a manual manipulation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A gear position display device of a transmission, comprising:
   the transmission having a plurality of gear positions;
   a speed-changing control portion that outputs a speed-changing instruction;
   a display portion that displays a gear value of the transmission when the transmission is in a D range; and
   a detection portion that detects a speed-changing state of a gear position based on said speed-changing instruction and includes a change rate detection portion that detects a rate of change in a rotation number of the transmission,
   wherein the detection portion detects the speed changing state when the rate of change in the rotation number is at least a predetermined value, and
   wherein said display portion displays the gear value based on the speed-changing instruction from speed-changing control portion and in response to the speed-changing state detected by said detection portion.

2. The gear position display device of a transmission according to claim 1, wherein the transmission is selectively operable in one of:
   an automatic speed-changing mode wherein a change of a gear position is automatically controlled according to an operation state and
   a manual speed-changing mode wherein a change of the gear position is caused by a manual manipulation to an arbitrary gear position or a shift range, and
   wherein the detection portion detects the speed changing state when the rate of change in the rotation number is at least a predetermined value only when the transmission is in the automatic speed-changing mode.

3. The gear position display device of a transmission according to claim 1, wherein the transmission is selectively operable in one of:
   an automatic speed-changing mode wherein a change of a gear position is automatically controlled according to an operation state and
   a manual speed-changing mode wherein a change of the gear position is caused by a manual manipulation to an arbitrary gear position or a shift range, and wherein the speed-changing state is detected only when the transmission is in the automatic speed-changing mode.

4. A gear position display device of a transmission, comprising:
the transmission including a plurality of gear positions;
speed-changing control means for outputting a speed-changing instruction;
display means for displaying a gear value of the transmission when the transmission is in a D range; and
detection means for detecting a speed-changing state of a gear position based on said speed-changing instruction and includes a change rate detection means for detecting a rate of change in a rotation number of the transmission,
wherein the detection means detects the speed-changing state when the rate of change in the rotation number is at least a predetermined value, and
wherein said display means includes a means for displaying the gear value based on the speed-changing control means and in response to the speed-changing state detected by said detection means.

5. The gear position display device of a transmission according to claim 4 wherein the transmission is selectively operable in one of:
an automatic speed-changing mode wherein a change of the gear position is automatically controlled according to an operation state and
a manual speed-changing mode wherein a change of the gear position is caused by a manual manipulation to an arbitrary gear position or a shift range, and
wherein the detection portion detects the speed-changing state when the rate of change in the rotation number is at least a predetermined value only when the transmission is in the automatic speed-changing mode.

6. The gear position display device of a transmission according to claim 4 wherein the transmission is selectively operable in one of:
an automatic speed-changing mode wherein a change of the gear position is automatically controlled according to an operation state and
a manual speed-changing mode wherein a change of the gear position is caused by a manual manipulation to an arbitrary gear position or a shift range, and
wherein the speed changing state is detected only when the transmission is in the automatic speed-changing mode.

7. The gear position display device of a transmission according to claim 3, wherein the gear value is defined by the speed-changing instruction without detecting whether the speed-changing state is detected, when the transmission is in the manual speed-changing mode.

8. The gear position display device of a transmission according to claim 1,
wherein if a target gear position after speed-changing is at least two gear positions away from a current gear position and the speed-changing is performed via an intermediate gear position, then the speed-changing state includes a determination of whether a generation of shock occurs in the intermediate gear,
wherein the generation of shock caused by the speed-changing instruction occurs when the speed-changing is an upshift speed-changing, and
wherein during the upshift speed-changing the display portion displays the current gear position, the intermediate gear position, and the target gear position.

9. The gear position display device of a transmission according to claim 6, wherein the gear value is defined by the speed-changing instruction without detecting whether the speed-changing state is detected, when the transmission is in the manual speed-changing mode.

10. The gear position display device of a transmission according to claim 4,
wherein if a target gear position after speed-changing is at least two gear positions away from a current gear position and the speed-changing is performed via an intermediate gear position, then the speed-changing state includes a determination of whether a generation of shock occurs in the intermediate gear,
wherein the generation of shock caused by the speed-changing instruction occurs when the speed-changing is an upshift speed-changing, and
wherein during the upshift speed-changing the display portion displays the current gear position, the intermediate gear position, and the target gear position.

11. A gear position display device of a transmission, comprising:
the transmission having a plurality of gear positions;
a speed-changing control portion that outputs a speed-changing instruction;
a display portion that displays a gear position of the transmission when the transmission is in a D range; and
a detection portion that detects a speed-changing state of a gear position based on said speed-changing instruction,
wherein said display portion displays a gear position based on the speed-changing instruction from said speed-changing control portion when a degree of a progress of changing in response to the speed-changing state detected by said detection portion reaches a predetermined degree set to correspond to a timing of generation of shock caused due to speed-changing.

12. The gear position display device of a transmission according to claim 11,
wherein said detection portion includes a change rate detection portion that detects a rate of change in a rotation number of the transmission, and
wherein the degree of the progress of speed-changing is determined by the rate of change in the rotation number detected by the change rate detection portion.

13. The gear position display device of a transmission according to claim 12 wherein the transmission is selectively operable in one of:
an automatic speed-changing mode wherein a change of a gear position is automatically controlled according to an operation state and
a manual speed-changing mode wherein a change of the gear position is caused by a manual manipulation to an arbitrary gear position or a shift range, and
wherein said display portion displays the gear position based on the speed-changing instruction from said speed-changing control portion when the degree of the progress of speed-changing based on the speed-changing state detected by said detection portion reaches the predetermined degree set to correspond to the timing of generation of shock caused due to speed-changing, only in the automatic speed-changing mode.

14. The gear position display device of a transmission according to claim 11 wherein the transmission is selectively operable in one of:
an automatic speed-changing mode wherein a change of a gear position is automatically controlled according to an operation state and
a manual speed-changing mode wherein a change of the gear position is caused by a manual manipulation to an arbitrary gear position or a shift range, and wherein said display portion displays the gear position based on the speed-changing instruction from said speed-changing control portion when the degree of the progress of speed-changing based on the speed-changing state detected by said detection portion reaches the predetermined degree set to correspond to the timing of generation of shock caused due to speed-changing, only in the automatic speed-changing mode.

15. The gear position display device of a transmission according to claim 14 wherein the display portion displays the gear position based only on the speed-changing instruction when the transmission is in the manual speed-changing mode.

16. The gear position display device of a transmission according to claim 8, wherein during a downshift speed-changing the display portion only displays the current gear position and the target gear position.

17. The gear position display device of a transmission according to claim 10, wherein during a downshift speed-changing the display portion only displays the current gear position and the target gear position.

18. The gear position display device of a transmission according to claim 11,
    wherein if a target gear position after speed-changing is at least two gear positions away from a current gear position and the speed-changing is performed via an intermediate gear position, then the speed-changing state includes a determination of whether the generation of shock occurs in the intermediate gear,
    wherein the generation of shock caused by the speed-changing instruction occurs when the speed-changing is an upshift speed-changing, and
    wherein during an upshift speed-changing the display portion displays the current gear position, the intermediate gear position, and the target gear position.

19. The gear position display device of a transmission according to claim 18, wherein during a downshift speed-changing the display portion only displays the current gear position and the target gear position.

* * * * *